(12) United States Patent
Schmitz et al.

(10) Patent No.: US 6,336,440 B1
(45) Date of Patent: Jan. 8, 2002

(54) MISFIRE DETECTION METHOD FOR A PISTON COMBUSTION ENGINE WITH ELECTROMAGNETIC FUEL CHARGE VALVE

(75) Inventors: Günter Schmitz; Thomas Esch, both of Aachen (DE)

(73) Assignee: FEV Motorentechnik GmbH, Aachen (DE)

(*) Notice: Subject to any disclaimer, the term of this patent is extended or adjusted under 35 U.S.C. 154(b) by 0 days.

(21) Appl. No.: 09/485,366

(22) PCT Filed: May 10, 1999

(86) PCT No.: PCT/EP99/03200

§ 371 Date: Feb. 9, 2000

§ 102(e) Date: Feb. 9, 2000

(87) PCT Pub. No.: WO99/64737

PCT Pub. Date: Dec. 16, 1999

(30) Foreign Application Priority Data

Jun. 10, 1998 (DE) .......................... 198 25 990

(51) Int. Cl.$^7$ ................................ F02P 5/00
(52) U.S. Cl. ...................... 123/406.27; 123/406.14
(58) Field of Search .......................... 123/435, 436, 123/676, 479, 406.14, 406.27, 481

(56) References Cited

U.S. PATENT DOCUMENTS 5,648,602 A  7/1997  Hoshina et al.
5,884,613 A  3/1999  Kitamura

FOREIGN PATENT DOCUMENTS

EP        0 611 882        8/1994
EP        0 823 622        2/1998

*Primary Examiner*—John Kwon
(74) *Attorney, Agent, or Firm*—Venable; Gabor J. Kelemen

(57) ABSTRACT

A method of detecting combustion misfires in an internal-combustion engine, includes the following steps: variably actuating valve drives of the engine by an electronic engine control; performing a load-dependent control with the control system by a cylinder-control program; the load-dependent control includes the step of reducing power in at least one cylinder by separately affecting ignition and fuel supply thereto; detecting, in the control system by the cylinder-control program, the cylinder of reduced power with a cylinder-identification signal; at predeterminable intervals detecting, from signals obtained in the preceding step, resulting deviations of predetermined operating data as normal operation; detecting, as combustion misfires, deviations of the predetermined operating data from the normal operation obtained in the preceding step; and generating a setting signal upon detecting deviations in the preceding step.

12 Claims, 3 Drawing Sheets

Figure 1:
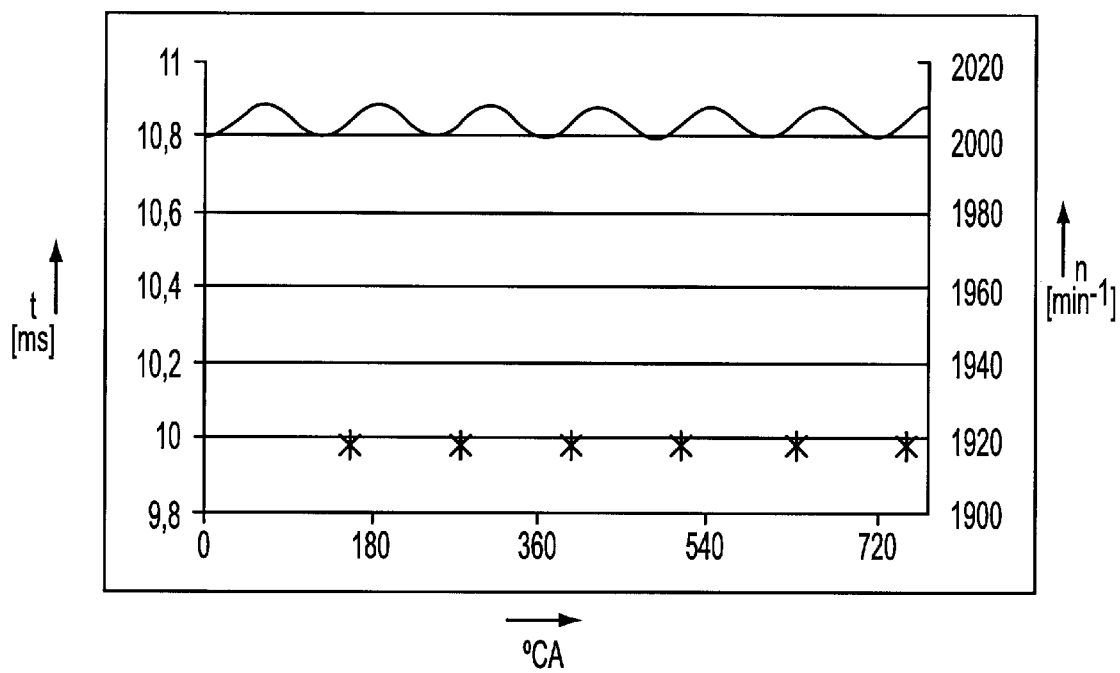

MISFIRE DETECTION METHOD FOR A PISTON COMBUSTION ENGINE WITH ELECTROMAGNETIC FUEL CHARGE VALVE

In piston combustion engines having cylinder valves with completely-variable control and actuation via an electronic engine control, it is also possible to effect a load-dependent control of the piston combustion engine: Instead of reducing the fuel supply to all cylinders in partial-load operation, depending on the requirements, only the power of individual cylinders is reduced to "zero power" through the manipulation of the fuel supply and ignition, while the other cylinders are fired normally.

For the example of a six-cylinder engine, based on partial-load requirements, two cylinders are reduced to zero power through the reduction or cutoff of the fuel supply and ignition. In an advantageous measure, two cylinders are not reduced to zero-load power, that is, stopped, for the entire duration of the partial-load phase; instead, different cylinders are stopped, with respect to their fuel supply and ignition, successively in a cyclical exchange during this partial-load phase, so two different cylinders are stopped and four other cylinders are fired completely in sequence. The advantage of this procedure is that, instead of a reduction in the fuel supply to all six cylinders, only the stopped cylinders receive no more fuel in order to adapt to partial-load operation, while the fired cylinders are supplied with a quantity of fuel that corresponds to the quantity of fuel that would practically be necessary for full-load operation. As a result, optimum combustion can take place in the fired cylinders.

Periodically reducing the power of individual cylinders or stopping them forces a change in predetermined operating data, such as a reduction in the running smoothness. This also occurs when some of the cylinders are only supplied with less fuel. Because the operating anomaly of reduced running smoothness can also be used to detect a misfire, the fact that this reduction in smoothness is caused by individual cylinders would cause it to be perceived as a combustion misfire with the use of corresponding sensor equipment, although the relevant cylinder would have been stopped. If actual combustion misfires occur in this type of partial-load operation, they cannot be readily detected through a detection of, for example, fluctuations in rpm, because in this operating mode the piston combustion engine ordinarily operates with more severe rpm fluctuations than in "normal operation" because of the programmed change in the valve control.

The term "fuel supply" encompasses systems in which the fuel is metered separately to the individual cylinders, as is the case in fuel injection directly into the respective cylinder or its intake port.

The term "combustion misfire" refers to a failure of the supply of fuel and/or the ignition for one or more cylinders that is not caused by the engine control, but by a disturbance.

It is the object of the invention to provide a method that permits the detection of combustion misfires, also in the above-described operating mode of a partial-load control, by way of a reduction in power to zero power for only a few of the cylinders.

According to the invention, this object is accomplished in that, in the engine control, a cylinder-control program detects at least the cylinders that are reduced in power in the respective load situation with a cylinder-identification signal, and, in predetermined time intervals, detects the resulting deviations of predetermined operating characteristic data as "normal operation," and deviations that exceed the predetermined operating data are recognized as having been caused by combustion misfires, and a control signal is generated. Over the sequence of cylinder-identification signals, at least for the cylinders operating at reduced power, the engine control detects a change in the predetermined operating characteristic data that was effected by a reduction in power of individual cylinders as "proper," and therefore as "normal operation," not only in full-load operation, but above all in partial-load operation.

If combustion misfires occur at cylinders that are fired completely or at reduced power during this type of operation, a change also occurs in the course over time of the detected operating characteristic data, which can be detected as "improper" through a deviation with respect to a predetermined threshold value of successive signals. Because the sequence of the cylinders that have been fired for the respective load situation has been predetermined by the cylinder-control program in the engine control, a precise allocation to the cylinder at which the combustion misfire occurred can be detected via the cylinder-identification signals. If combustion misfires occur, an "on-board diagnosis" can take place in, for example, the form of a control signal that is generated as a indicator, which compels the driver to seek the cause of the combustion misfire by taking the vehicle to a mechanic. It is also possible, however, to react directly via the engine control, and, at the cylinder for which a combustion misfire has been detected, to cut off the ignition and the fuel supply for one or more cylinders, or permanently, and perform the load distribution to the individual cylinders differently, via the engine control, corresponding to the load requirements predetermined by the driver.

An embodiment of the invention provides that the rpm fluctuations are detected as operating characteristic data to be predetermined.

An advantageous embodiment of the invention provides that the rpm fluctuations are detected as a periodic time signal, and time differences between successive time signals due to changing rpm fluctuations are detected as combustion misfires.

In another embodiment of the method of the invention, the indicated medium pressures of the individual cylinders are detected as predetermined operating characteristic data. The value for the indicated medium pressure, that is, the work generated per cycle, can be realized from the determination of the pressure course for each individual cylinder. In the process, the crankshaft position determined by corresponding sensors is converted into the instantaneous cylinder volume, and the work is determined through the creation of the contour integral $\int PdV$, or the so-called indicated medium pressure Pmi is determined through division by the displacement. If the engine control operates one or more cylinders, or one cylinder successively in a cyclical exchange, at reduced power—which can also be zero power—specifically for partial-load operation, this is ascertained as a reduction in the indicated medium pressure Pmi. If this value lies below a predetermined threshold, the presence of a combustion misfire would be detected for the relevant cylinder. Because, however, the cylinder-control program in the engine control makes it known which cylinder is being operated at reduced power, the engine control only detects the presence of a combustion misfire if the reduced indicated medium pressure is detected at a cylinder that is operating properly at full power in accordance with the engine-control program, or is to be operated at reduced power. The threshold value of the indicated medium pressure of this programmed reduced power then represents the threshold that is detected as a combustion misfire when the value is not met for the relevant cylinder. As an alternative, the method can be modified such that the determined Pmi values for the cylinders that are known to be operating, i.e., are programmed to operate, at reduced power are multiplied by a corresponding factor, that is, "extrapolated," before the threshold-value comparison. Thus, a detection of combustion misfires at cylinders that are operating properly at full load, or at reduced power, is also possible.

In another embodiment of the invention, it is provided that the exhaust-gas pressure in the exhaust train is detected as operating characteristic data to be predetermined. This pressure can be detected in the intake ports of the individual cylinders, so the association with individual cylinders can also be performed purely geometrically according to the position of the individual pressure sensors.

If it is desired to reduce the number of pressure sensors, it is also possible to detect the fluctuations in exhaust-gas pressure with only one pressure sensor in the exhaust train, namely directly behind the junction of the partial exhaust ports originating from the individual cylinders. The pressure fluctuations occurring in the exhaust train can be attributed to the individual cylinders via a corresponding signal tap at the crankshaft. The absence of combustion, whether due to the absence of a fuel supply or the absence of ignition, manifests itself through a significant pressure drop in the exhaust train. If this pressure drop is to be effected via the engine control, the signal originating from the pressure sensor is suppressed, and the deviation ascertained here is still detected as "normal operation." If, however, this pressure drop relates to a cylinder that is to be fired according to the cylinder-control program, the pressure drop is detected as a combustion misfire, and triggers a corresponding signal. The aforementioned partial firing of individual cylinders via the engine-control program similarly manifests itself in the form of a pressure drop in the exhaust train, even if it is less dramatic.

In another embodiment of the method of the invention, it is provided that an ionic current in the combustion chambers of the individual cylinders is detected as operating characteristic data to be predetermined. A dedicated sensor or an ionic-current detection integrated into the spark plug of the respective cylinder can detect the ionic current. The invention advantageously utilizes the fact that an ionic current can only flow at a fired cylinder, i.e., in a cylinder that contains hot combustion gases, even if the cylinder is only operated at partial load. If, however, a combustion misfire exists, so no combustion occurs, an ionic current ceases, so a combustion misfire can again be detected in the engine control, based on this deviation, if this cylinder was supposed to be fired according to the cylinder-control program.

In an advantageous modification of the method of the invention, it is provided that the respective load of the fired cylinders is detected, and factored into the allocation to the course of the rpm fluctuations. Because changing load requirements in addition to the shutoff of one or more cylinders can also be effected through changes in the fuel supply during operation with cylinder shutoffs, particularly during operation with alternating cylinder shutoff, changes also occur in the predetermined operating data, especially in the detection of rpm fluctuations, if the fuel supply and therefore the load for the individual cylinders are changed in a predetermined cylinder-shutoff program. The engine control can also recognize this situation in order to use the changes in the rpm fluctuations to determine here whether these changes are "proper" or "improper." The timing gap that occurs in the shutoff of a cylinder does not trigger the control signal, but is suppressed. Not until a further timing gap is detected in addition to the "anticipated" timing gap does the engine control react. The metering of air to the individual cylinders during the opening times allows the respective load of the fired cylinder to be detected.

In an embodiment of the method of the invention, it is provided that the engine control's procedure for detecting combustion misfires is shut off when fluctuations in the operating characteristic data, particularly rpm fluctuations, are induced externally, especially by way of the drive train. This is particularly the case when a piston combustion engine of this type is to be used as a vehicle drive, and the relevant vehicle travels, for example, on a road that has potholes or severe uneven spots, so, due to the greatly-fluctuating torque decrease, corresponding rpm changes are induced in the piston combustion engine by way of the drive train.

An advantageous further embodiment of the invention provides that the control signal cuts off the fuel supply, the ignition and the actuation of the cylinder valves of the cylinder for which combustion misfires have been detected. This method advantageously utilizes the advantage of the electronic engine control with the load-dependent shutoff and switch-on of individual cylinders. If the method is used to detect that a sequence of combustion misfires has taken place for a cylinder, this cylinder is stopped for the continued engine operation. Because electromagnetically-actuated cylinder valves can be kept in the open position when switched off, the shut-off cylinder runs "idle." The engine control considers the shut-off cylinder in the sequence of the cylinders to be fired or not. Only a full-load operation with the firing of all cylinders is no longer possible. Instead of switching off all electromagnetic valve gears of the cylinder to be shut off, it may also be advantageous to continue actuating the intake valves at these cylinders in normal operation, but to actuate the exhaust-gas valves such that the compression stroke is omitted, so the stopped cylinder has no braking effect.

Figure 2:
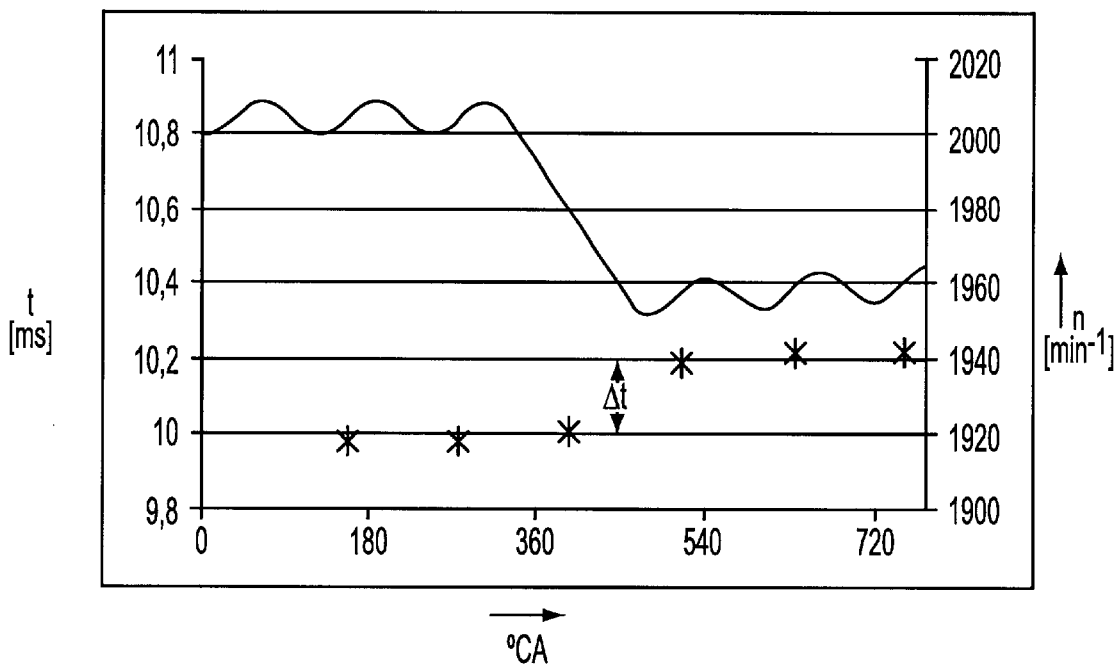
Figure 3:
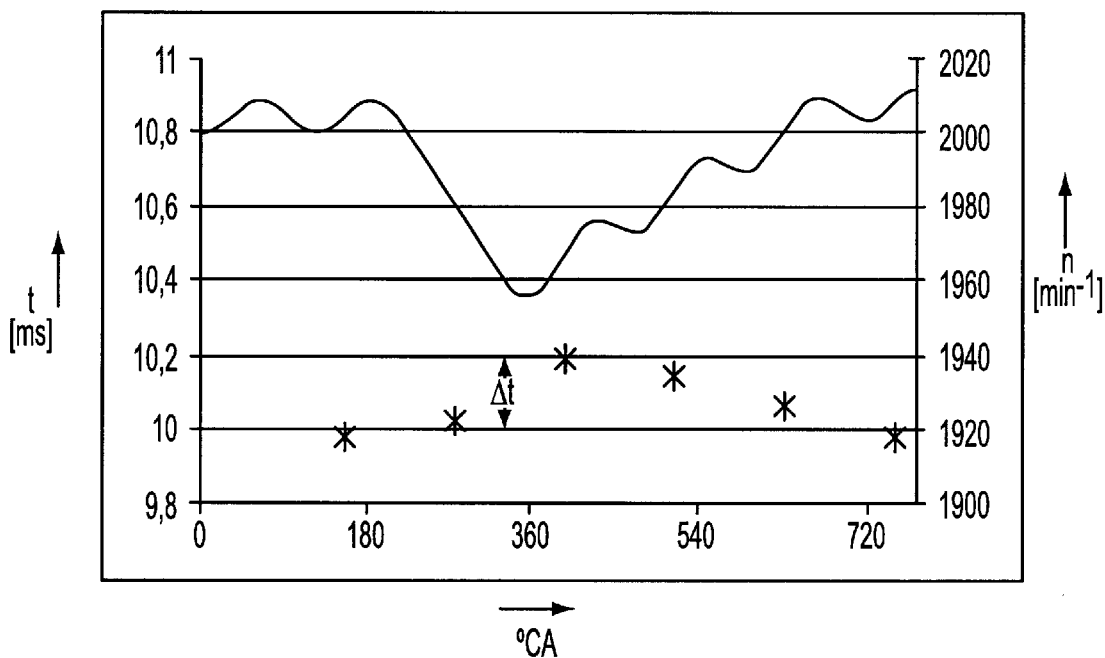
Figure 4:
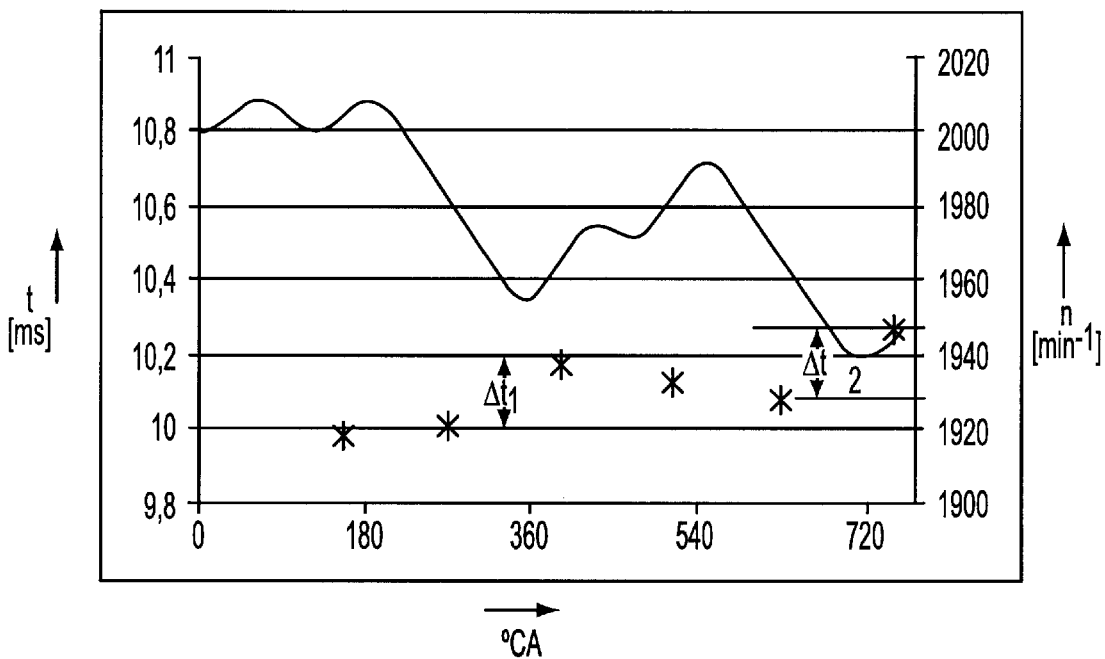
Figure 5:
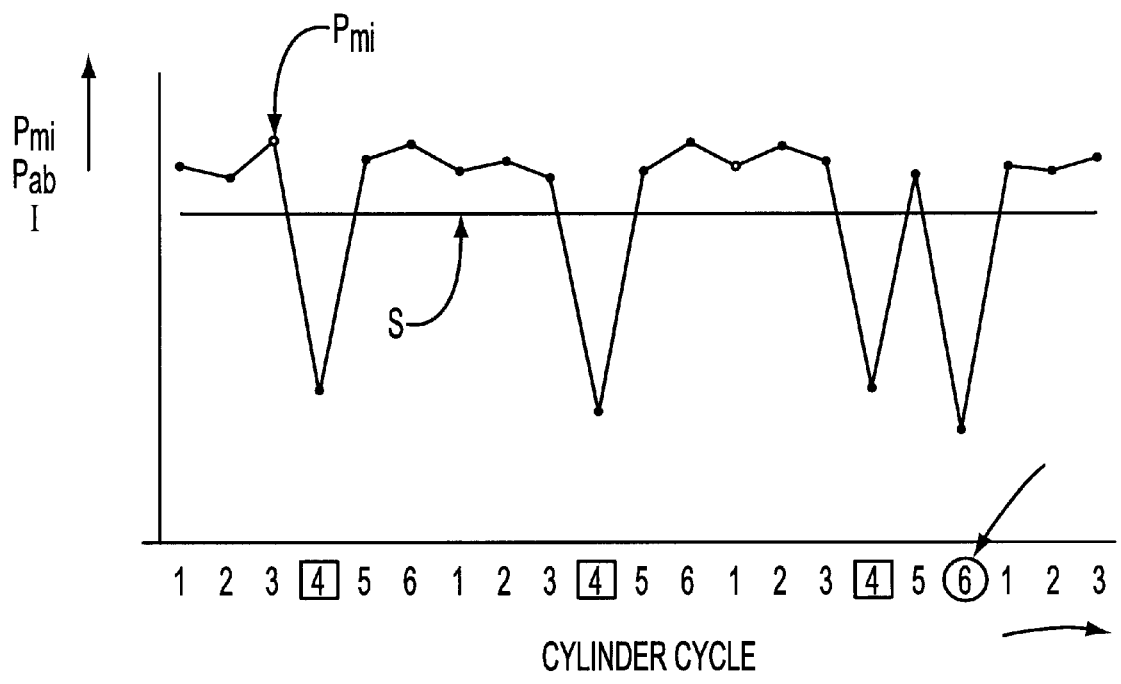
Figure 6:
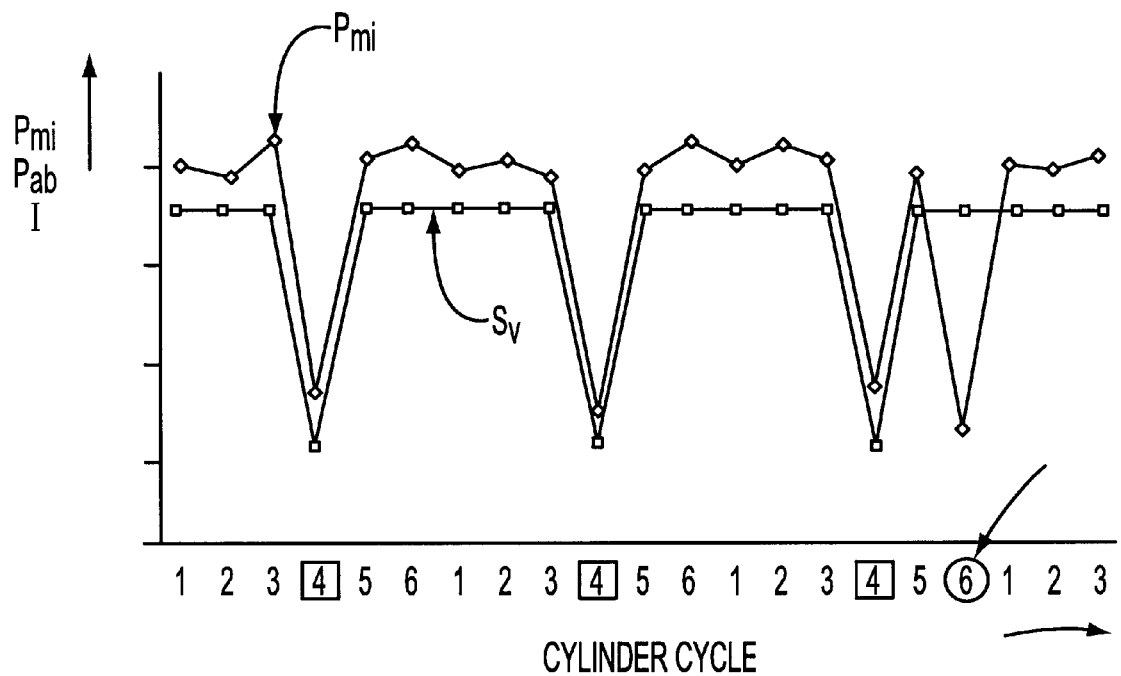

The method is explained in detail below, in conjunction with diagrams of different rpm courses of a six-cylinder engine, for the example of rpm fluctuations as the operating characteristic data that are to be predetermined. Shown are in:

FIG. 1 an rpm course as a function of the crankshaft position, with an additional time signal;

FIG. 2 an rpm course with a combustion misfire;

FIG. 3 an rpm course with the desired cylinder shutoff;

FIG. 4 an rpm course in the operating mode according to FIG. 3, with an additional combustion misfire;

FIG. 5 a pressure course with the detection of a combustion misfire according to the prior art; and FIG. 6 an rpm course with the detection of a combustion misfire according to the invention.

FIG. 1 shows an rpm course in normal six-cylinder operation. The rpm fluctuations are very uniform and, in the illustrated example, lie in a narrow band above 2000 rpm. A periodic time signal that indicates the time required for the last 120-degree crank angle is used to detect rotational conformabilities. In smooth operation, practically the same time is required for each interval. With a drop in rpm, in contrast, the crankshaft passes through the same rotational-angle interval over a longer period of time. It is also possible to predetermine a smaller crank-angle range of, for example, 60 degrees. Other crank-angle intervals or, upon inquiry, time intervals, are also suitable in principle. With other numbers of cylinders, it is advantageous to predetermine crank-angle intervals. The respective, emitted periodic time signal is represented as an asterisk, and lies slightly under 10 ms in stationary normal operation for the illustrated rpm.

FIG. 2 illustrates the case of a combustion misfire at a cylinder due to an ignition or injection misfire at a cylinder in the six-cylinder engine under otherwise identical operations. It is apparent that the misfire at a cylinder causes the engine rpm to drop and the periodic time signal to jump suddenly to a value of about 10.2 ms. This jump can be used as the primary criterion for detecting a combustion misfire. The difference between two successive difference times $\Delta t$ can also be compared to a threshold value that may in turn be dependent on, for example, the operating point of the engine, such as load and rpm. If this threshold value is exceeded, combustion misfires are detected, and a corresponding signal is generated if the cylinder-control program provides no identification signal to the engine control for a desired shutoff of this cylinder. From the association of the occurring time difference $\Delta t$ with the degree of the crank angle, the engine control can also detect at which cylinder the misfire has occurred.

FIG. 3 illustrates an operating mode in which, corresponding to the cylinder-control program, a cylinder has been purposefully stopped. The rpm therefore drops, but quickly reaches the original desired level, because the engine control compensates the missing component of the stopped cylinder in the total torque through a higher load control for the other cylinders that are still operating. It is apparent, however, that a time difference can also be ascertained in the periodic time signal, as would be the case if an ignition or injection misfire occurred at the relevant cylinder. Nevertheless, because the relevant cylinder has been purposefully stopped and the engine control has been "informed" of this by the cylinder-control program, and reacts by increasing the load on the remaining cylinders, the detection of combustion misfires in the engine control is deactivated for this operating case. The sequence of the periodic time signal reveals that the original signal time for the crank-angle range detected over time is again attained as the rpm increases to the original value. The further course of the rpm then approximately corresponds to the diagram of FIG. 1, but with somewhat more dramatic and less uniform rpm fluctuations.

For an operating mode according to FIG. 3, that is, when a cylinder should be shut off, FIG. 4 illustrates how the temporal sequence of the periodic time signals ensues when, in addition to the desired shutoff of, for example, one cylinder, a combustion misfire also occurs at one of the cylinders that is still operating. The time difference $\Delta t$ that first occurs between the periodic time signal at 160 degrees and the time signal at 380 degrees when the rpm drops after the cylinder-control program shuts off the cylinder does not trigger a reaction by the engine control, because this detection was deactivated due to the desired cylinder shutoff, or the associated threshold value was correspondingly modified.

If, following the shutoff due to a combustion misfire, the rpm drops further, another time difference $\Delta t_2$ occurs between the time signal at 640 degrees and the successive time signal at 760 degrees. This second occurrence of a further time difference in the sense of a drop in rpm was not "detectable" for the engine control through a cylinder identification signal, so this second time jump was not anticipated and is thus detected as a combustion misfire, and a corresponding reaction can be initiated.

According to the method of the invention, an analogous procedure is employed when the indicated medium pressures Pmi of the individual cylinders, or the exhaust-gas pressure Pab in the exhaust train, or an ionic current in the combustion chamber of the individual cylinders is or are to be detected as predetermined operating characteristic data instead of the rpm fluctuations. The sole difference, then, is that these operating characteristic data must accordingly be detected for the individual cylinders periodically, and no longer must be detected only by way of the crankshaft, as is the case for the detection of rpm fluctuations. Instead of the detection of a time difference, in the presetting of the rpm fluctuations as the operating characteristic data to be detected, depending on the operating characteristic data, the operating characteristic data to be predetermined, in other words, the indicated medium pressure Pmi or the exhaust-gas pressure Pab or the ionic current I, are to be monitored periodically, i.e., by the interval of one or more work cycles of the respective cylinders.

FIG. 5 shows a schematic measurement diagram for the temporal sequence of the indicated medium pressures Pmi as measuring points for a six-cylinder engine; the measuring points are connected merely for the sake of clarity. The value for the indicated medium pressure is shown above the respectively active cylinder. Cyclical fluctuations that are typical particularly for a gasoline engine are apparent.

In the engine viewed here, the engine control has purposefully shut off or reduced the load for the cylinder 4, so the indicated pressure for this cylinder is significantly less than for the other cylinders.

In the conventional method for detecting ignition misfires, a fixed desired-value threshold S is predetermined. Consequently, the significantly-reduced pressure caused by the purposeful shutoff or reduced load for the cylinder 4 is diagnosed as a combustion misfire, and no distinction is possible with respect to the combustion misfire at the cylinder 6 at the end of the observed cycle.

In the method of the invention, this is avoided by the use of a variable threshold $S_v$. Because the engine control "knows" that the cylinder 4 has been shut off or is being operated with a reduced load, the threshold is decreased accordingly, so no diagnosis of "combustion misfire" is reached for the cylinder 4. In the real combustion misfire in the third cycle for the cylinder 6, however, the threshold is clearly not met, so the engine control can detect this operating anomaly as a combustion misfire. The detection of the pressure in the exhaust train yields a comparable diagram. Here, the exhaust-gas pressure is sampled at an especially informative time, which is likewise predetermined by the engine control. Comparable diagrams are also created in the detection of the ionic current. As shown in FIG. 6, in both cases, the engine control decreases the threshold value $S_v$ for the respective cylinder that has been shut off by the program, or is operating with a reduced load, so only "true" combustion misfires can be detected.

What is claimed is:

1. A method of detecting combustion misfires in an internal-combustion engine, including the steps of
    variably actuating valve drives of the engine by an electronic engine control;
    performing a load-dependent control with the control system by a cylinder-control program; the load-dependent control including the step of
    reducing power in at least one cylinder by separately affecting ignition and fuel supply thereto;
    the improvement comprising the steps of
    (a) detecting, in the control system by the cylinder-control program, said at least one cylinder with a cylinder-identification signal;

(b) at predeterminable intervals detecting, from signals obtained in step (a), resulting deviations of predetermined operating data as normal operation;

(c) detecting, as combustion misfires, deviations of the predetermined operating data from said normal operation obtained in step (b); and (d) generating a setting signal upon detecting deviations in step (c).

2. The method as defined in claim 1, further comprising the step of detecting rpm fluctuations as operating data.

3. The method as defined in claim 2, further comprising the steps of (e) detecting the rpm fluctuations as a periodic time signal; and (f) detecting, as combustion misfires, time differences existing between successive time signals and caused by changing rpm fluctuations.

4. The method as defined in claim 1, further comprising the steps of (e) indicating a medium pressure; and (f) detecting the medium pressure as the predetermined operating data.

5. The method as defined in claim 1, further comprising the step of detecting the exhaust-gas pressure in an exhaust train of the engine as the predetermined operating data.

6. The method as defined in claim 1, further comprising the step of detecting an ionic current in the combustion chamber of cylinders of the engine as the predetermined operating data.

7. The method as defined in claim 1, further comprising the steps of (e) detecting a cylinder load of operating cylinders; and (f) using the detected cylinder load in determining courses of deviations in step (b).

8. The method as defined in claim 1, further comprising the steps of (e) detecting a cylinder load of said at least one cylinder operating at reduced power; and (f) using the detected cylinder load in determining courses of deviations in step (b).

9. The method as defined in claim 1, after step (d) further comprising the step of cutting off fuel supply and ignition for the cylinder for which combustion misfires are detected in step (c).

10. The method as defined in claim 1, after step (d) further comprising the step of switching to idle operation the electromagnetic valve drive of the cylinder for which combustion misfires are detected in step (c).

11. The method as defined in claim 1, further comprising the steps of (e) shutting off the cylinder for which combustion misfires are detected in step (c); and (f) modifying the control program as a function of the operational removal of the cylinder in step (e).

12. The method as defined in claim 1, further comprising the step of shutting off the method in response to detecting externally induced rpm fluctuations.

* * * * *